United States Patent
Futch et al.

(10) Patent No.: US 11,572,233 B2
(45) Date of Patent: Feb. 7, 2023

(54) MOBILE SORTER PLATFORMS AND METHOD FOR SORTING ARTICLES

(71) Applicant: Tompkins Robotics, Inc., Raleigh, NC (US)

(72) Inventors: Michael C. Futch, Raleigh, NC (US); James M. Serstad, Orlando, FL (US); Ryan Fehrenbacher, Chicago, IL (US); Milan Patel, Cleveland, OH (US); Ray Wells, Asheville, NC (US); Steven Wu, Raleigh, NC (US); Richard C. Kaminska, III, Orlando, FL (US); James Edouard, Orlando, FL (US); Denny McKnight, Raleigh, NC (US); John C. Spain, Raleigh, NC (US)

(73) Assignee: Tompkins Robotics, Inc., Raleigh, NC (US)

( * ) Notice: Subject to any disclaimer, the term of this patent is extended or adjusted under 35 U.S.C. 154(b) by 196 days.

(21) Appl. No.: 17/156,963

(22) Filed: Jan. 25, 2021

(65) Prior Publication Data
US 2021/0139243 A1   May 13, 2021

Related U.S. Application Data

(63) Continuation of application No. 16/363,105, filed on Mar. 25, 2019, now Pat. No. 10,899,542, which is a
(Continued)

(51) Int. Cl.
*B65G 1/137* (2006.01)
*B65G 1/02* (2006.01)

(52) U.S. Cl.
CPC ............ *B65G 1/1375* (2013.01); *B65G 1/02* (2013.01); *B65G 1/1378* (2013.01)

(58) Field of Classification Search
CPC ....... B65G 1/1375; B65G 1/02; B65G 1/1378
See application file for complete search history.

(56) References Cited

U.S. PATENT DOCUMENTS

| 8,731,708 B2 | 5/2014 | Shakes et al. |
| 8,857,348 B2 | 10/2014 | Gevaert et al. |
| (Continued) | | |

FOREIGN PATENT DOCUMENTS

| CN | 104525488 A | 4/2015 |
| EP | 3172016 A1 | 1/2016 |
| (Continued) | | |

OTHER PUBLICATIONS

EPO, Extended European Search Report for EP Patent Application No. 18764345.7, dated Apr. 21, 2021, 9 pages.
(Continued)

*Primary Examiner* — Kyle O Logan
(74) *Attorney, Agent, or Firm* — Parthiban A Mathavan

(57) ABSTRACT

Platform assembly for use with sorting articles comprises platforms connected to each other to form at least one level surface for transit thereabout by a plurality of vehicles. Each platform defines a first orientation in which the platform is in a retracted position and a second orientation in which the platform is in an extended position with a horizontal disposition. Each platform includes a first panel comprising a plurality of markers thereon, the markers forming a grid on the first panel for transit thereabout by the plurality of vehicles. Each marker includes a magnetic signature for determining an orientation of the marker. A container is positioned about at least one of the plurality of markers. In operation, the vehicle is directed by a control system to deposit an article carried thereon into a container associated with a marker based on the location and orientation of the marker.

25 Claims, 13 Drawing Sheets

Related U.S. Application Data continuation-in-part of application No. 16/232,669, filed on Dec. 26, 2018, now Pat. No. 10,870,131, which is a continuation of application No. PCT/US2018/046460, filed on Aug. 13, 2018.

(60) Provisional application No. 62/545,814, filed on Aug. 15, 2017.

(56) References Cited

U.S. PATENT DOCUMENTS

| | | | |
|---|---|---|---|
| 8,857,625 | B1 | 10/2014 | Oropeza |
| 9,152,149 | B1* | 10/2015 | Palamarchuk ........... G06F 16/29 |
| 10,133,276 | B1* | 11/2018 | Shydo, Jr. ............ G05D 1/0223 |
| 2007/0179690 | A1 | 8/2007 | Stewart |
| 2008/0077511 | A1* | 3/2008 | Zimmerman ........ G06Q 10/087 |
| | | | 705/28 |
| 2009/0128139 | A1* | 5/2009 | Drenth .................... G01R 33/02 |
| | | | 324/207.22 |
| 2012/0282070 | A1* | 11/2012 | D'Andrea .............. G05B 13/00 |
| | | | 414/812 |
| 2012/0290125 | A1* | 11/2012 | Perry .................... B65G 63/004 |
| | | | 700/218 |
| 2013/0317642 | A1* | 11/2013 | Asaria .................... G06Q 10/08 |
| | | | 700/216 |
| 2014/0067184 | A1 | 3/2014 | Murphy |
| 2014/0118117 | A1 | 5/2014 | Zomchek et al. |
| 2014/0172223 | A1* | 6/2014 | Murphy ................... G05D 1/00 |
| | | | 701/25 |
| 2014/0228999 | A1* | 8/2014 | D'Andrea ............... B66F 9/063 |
| | | | 700/214 |
| 2014/0350725 | A1* | 11/2014 | LaFary ................ G05D 1/0274 |
| | | | 901/50 |
| 2015/0139762 | A1 | 5/2015 | Stephens |
| 2015/0332213 | A1 | 11/2015 | Galluzzo et al. |
| 2016/0067746 | A1 | 3/2016 | Soukos |
| 2016/0236869 | A1* | 8/2016 | Kimura ................ B65G 1/1378 |
| 2016/0242457 | A1 | 8/2016 | Minnicucci et al. |
| 2016/0271800 | A1* | 9/2016 | Stubbs ................. G05D 1/0234 |
| 2016/0378116 | A1* | 12/2016 | Nguyen .................... B25J 5/007 |
| | | | 701/23 |
| 2017/0029213 | A1* | 2/2017 | Johnson ................. B25J 11/008 |
| 2017/0200248 | A1 | 7/2017 | Murphy |
| 2017/0274531 | A1* | 9/2017 | Johnson ............... G06Q 10/087 |
| 2017/0278047 | A1* | 9/2017 | Welty .................... G05D 1/0011 |
| 2017/0285648 | A1* | 10/2017 | Welty .................... G05D 1/0248 |
| 2019/0004521 | A1* | 1/2019 | Nguyen ............... G05D 1/0263 |
| 2019/0218035 | A1 | 7/2019 | Futch et al. |

FOREIGN PATENT DOCUMENTS

| | | |
|---|---|---|
| SU | 1323380 A1 | 7/1987 |
| WO | 2019036346 A1 | 2/2019 |

OTHER PUBLICATIONS

WIPO, International Preliminary Report on Patentability for corresponding PCT Patent Application No. PCT/US2020/024624, dated Sep. 28, 2021, 5 pages.

EPO, Extended European Search Report in European Application No. 18846871.4-1014 dated Mar. 15, 2021.

* cited by examiner

MOBILE SORTER PLATFORMS AND METHOD FOR SORTING ARTICLES

CROSS-REFERENCE TO RELATED APPLICATIONS

This application is a Continuation of U.S. patent application Ser. No. 16/363,105 filed on Mar. 25, 2019, to be issued as U.S. Pat. No. 10,899,542, which is a Continuation In Part (CIP) of U.S. patent application Ser. No. 16/232,669 filed on Dec. 26, 2018, now U.S. Pat. No. 10,870,131, which claims priority to PCT Patent Application No. PCT/US2018/046460 filed on Aug. 13, 2018, which claims priority to U.S. Provisional Patent Application No. 62/545,814 filed on Aug. 15, 2017, the entire contents of which are incorporated by reference herein.

TECHNICAL FIELD

The present invention relates to mobile sorter platforms for sorting articles, the mobile sorter platforms including markers for navigation of computer-controlled transport vehicles, and containers for receiving the sorted articles from the computer-controlled transport vehicles.

BACKGROUND

There is an increasing need for traditional brick-and-mortar retailers to perform competitively in ecommerce & BOPIS (Buy Online Pickup In Store) fulfillment. Most ecommerce fulfillment is performed in dedicated fulfillment centers. However, these fulfillment centers require dedicated inventory and are often further from the customers than the physical stores or local omni-channel fulfillment centers. By using the inventory that is already located in brick-and-mortar stores or local mini distribution centers, and by taking advantage of the proximity of these operating sites to customers, a retailer can fulfill ecommerce orders at a lower cost and with a shorter delivery time than from a dedicated fulfillment center. BOPIS can also be filled more effectively and provide a competitive advantage by leveraging the ability to efficiently fulfill small, individual customer orders.

In order to fulfill ecommerce orders from within a store, typically employees pick items from store shelves and from back-room storage locations. Typically, this process is to have employees pick individual orders discretely, or to pick a few orders discretely in a batch. This requires the employee to potentially travel the entire store to pick one or a small number of orders. The other way to process this is to batch pick a large number of orders and then manually sort the items out to individual orders. All of these options are very labor-intensive, slow, and prone to error given that most of these employees are typically transitional or low skilled. Additionally, once an ecommerce order is complete and packed for parcel shipment, the outbound parcel orders also need to be sorted according to the customer destination. In a dedicated fulfillment center, both item sorting and parcel sorting would be performed by automated sorting equipment. Such equipment is too large, too expensive, and too inflexible to be used in the back room of a retail store. In addition, these large systems are fixed assets that occupy a large space and cannot be moved into and out of areas and service.

Therefore, a need exists for mobile platforms to enable improved sorting systems to be implemented in the back rooms of retail stores and in similar other applications.

SUMMARY OF THE INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a platform assembly for use with sorting articles. The platform assembly comprises a plurality of platforms connected to each other to form at least one level surface for transit thereabout by a plurality of vehicles, each platform defining a first orientation in which the platform is in a retracted position and a second orientation in which the platform is in an extended position with a horizontal disposition, each platform including a first panel comprising a plurality of markers thereon, the markers forming a grid on the first panel for transit thereabout by the plurality of vehicles, each marker including a magnetic signature for determining an orientation of the marker. A container is positioned about at least one of the plurality of markers. In operation, the vehicle is directed by a control system to deposit an article carried thereon into a container associated with a marker based on the location and the determined orientation of the marker.

According to one or more embodiments, the plurality of platforms includes a first platform and a second platform, wherein a short side of the first panel of the first platform adjoins a short side of a first panel of the second platform such that the first panels of the first and second platforms form a level surface for transit thereabout by the plurality of vehicles.

According to one or more embodiments, the first platform is detachably attached to the second platform by an interlocking mechanism.

According to one or more embodiments, each platform includes wheels to provide mobility to the platform.

According to one or more embodiments, the first panel defines two partial sections that are pivotably engaged when the platform is in the extended position.

According to one or more embodiments, each platform further includes a second panel, wherein the first panel is elevated compared to the second panel.

According to one or more embodiments, each platform further includes a drive mechanism for imparting mobility to at least one of the plurality of vehicles to move the at least one of the plurality of vehicles towards the container associated with the marker.

According to one or more embodiments, each platform further includes a platform controller coupled to the platform, wherein the platform controller is configured for communicating with the plurality of vehicles.

According to one or more embodiments, the platform controller is further configured to transmit one or more of location information, direction information and system operation parameters information to the vehicle to facilitate transit of the vehicle on the first panel.

According to one or more embodiments, the platform controller is further configured to communicate with one or more of the plurality of platforms to facilitate transit of the vehicle on the first panel.

According to one or more embodiments, the platform controller is further configured to communicate with the control system to facilitate transit of the vehicle on the first panel.

According to one or more embodiments, at least one marker comprises an RFID tag and a magnetic array, the magnetic array comprising one or more magnetic bars, wherein the magnetic bars extend from a periphery of the RFID tag to form a magnetic field that produces the magnetic signature.

According to one or more embodiments, the RFID tag is configured to provide a location of the marker, and a magnetic force is configured to provide an orientation of the marker, wherein the magnetic force corresponds to the magnetic field that produces the magnetic signature.

According to one or more embodiments, the container is associated with a delivery hub, delivery route, a zip code or other geographic identifier, wherein the delivery hub, delivery route, zip code or other geographic identifier is associated with a plurality of articles.

Disclosed herein is a platform assembly for use with sorting articles. The platform assembly comprises a plurality of platforms connected to each other to form at least one level surface for transit thereabout by a plurality of vehicles, each platform defining a first orientation in which the platform is in a retracted position and a second orientation in which the platform is in an extended position with a horizontal disposition, each platform including a first panel comprising a plurality of markers thereon, the markers forming a grid on the first panel for transit thereabout by the plurality of vehicles, each marker including a magnetic signature for determining an orientation of the marker. A platform controller is coupled to the platform for communicating with the plurality of vehicles, wherein a container is positioned about at least one of the plurality of markers. In operation, the vehicle receives one or more of location information, direction information, and system operation parameters information from the platform controller to facilitate transit of the vehicle on the first panel to deposit an article carried thereon into a container associated with a marker based on the location and the determined orientation of the marker.

According to one or more embodiments, the platform controller further communicates with one or more of the plurality of platforms to facilitate transit of the vehicle on the first panel.

According to one or more embodiments, each platform further includes a drive mechanism for imparting mobility to at least one of the plurality of vehicles to move the at least one of the plurality of vehicles towards the container associated with the marker.

Disclosed herein is a system for use with sorting articles that comprises a platform assembly comprising a plurality of platforms connected to each other to form at least one level surface for transit thereabout by a plurality of vehicles, each platform defining a first orientation in which the platform is in a retracted position and a second orientation in which the platform is in an extended position with a horizontal disposition, each platform including a first panel comprising a plurality of markers thereon, the markers forming a grid on the first panel for transit thereabout by the plurality of vehicles, each marker including a magnetic signature for determining an orientation of the marker. A platform controller is coupled to the platform, the platform controller configured to communicate over a network with the vehicle to provide one or more of location information, direction information, and system operation parameters information to the vehicle to facilitate transit of the vehicle on the first panel to deposit an article carried thereon into a container associated with a marker based on the location and the determined orientation of the marker.

According to one or more embodiments, the platform controller is further configured to communicate over the network with one or more of the plurality of platforms to facilitate transit of the vehicle on the first panel.

According to one or more embodiments, the platform controller is further configured to communicate with a control system to facilitate transit of the vehicle on the first panel, wherein the control system configured to: determine a location and an orientation of the marker; determine an identity of the article carried by the vehicle based on an identifier on the article; and communicate over a network with the vehicle to direct the vehicle to deposit the article carried thereon into the container associated with the marker.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings.

Figure 1:
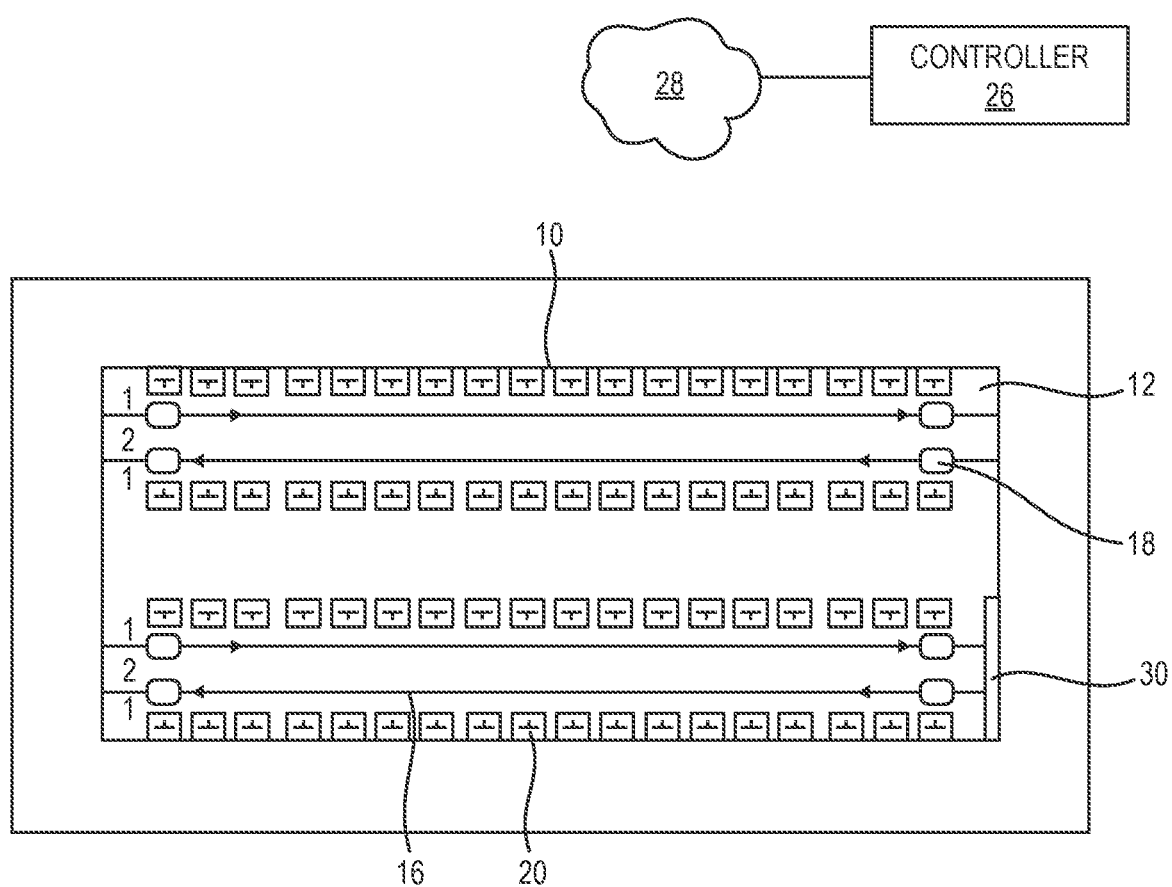
FIG. 1 is a schematic structural diagram of a platform assembly according to the present invention.

Referring to FIG. 1, a mobile platform assembly according to the present invention for use for sorting articles is generally designated numeral 10. The mobile platform assembly 10 includes at least one panel, i.e., first panel 12, having at least one surface on which computer-controlled transport vehicles 18 may traverse. While FIG. 1 illustrates platform assembly 10 as having a single platform, as will be explained later—particularly with respect to FIGS. 12A to 12E, platform assembly 10 may include several platforms such as platforms 60a, 60b, 60c and 60d shown in FIGS. 12A-12E that may be adjoined in various configurations to form a single composite platform assembly 10. In FIG. 1, platform assembly 10 comprises a single platform having similar features as platforms 60a, 60b, 60c and 60d illustrated in FIGS. 12A-12E; in other words, by incorporation herein, platforms 60a, 60b, 60c and 60d shown in FIGS. 12A-12E share several of the qualities of mobile platform assembly 10 as explained herein.

In one embodiment, the mobile platform assembly includes caster wheels on the base and in contact with floor, allowing mobility. The mobile platform assembly is capable of attaching to one another to create a larger system compiled of a series of the table-like structures. The mobile platform assembly may be capable of collapsing to reduce the footprint and allow easier movement and storage during periods not in use. When a mobile platform assembly is foldable, the surface of each panel is attached to the center support by a hinged support which allows the surface to be rotated to a vertically position for storage, or horizontally for sorting operations. In some embodiments, the at least one foldable table has two or more surfaces which computer-controlled transport vehicles may traverse. The two or more surfaces are all attached to the center support by a hinge which allows the table to be stored with all surfaces in a vertical position. The two or more surfaces may also be positioned horizontally for sorting operations.

In some embodiments, a series of foldable tables or platforms (the term "table" may be interchangeably referred to herein as "platform") are adjoined at the short side such that they form a long platform with at least one surface on which the transport vehicles 18 may traverse. In such embodiments, the platform assembly 10 may comprise a plurality of platforms that interlock with each other through a series of interlocking or similar other mechanism that joins these platforms together to form a single surface on which the transport vehicles 18 may traverse. Depending on the application, the platforms may be connected together in various configurations and shapes. For example, in one embodiment, the platforms may be joined at right angles, end to end, into a large block where each platform is connected on every side to another platform. As a further example, the platforms may be connected into a series of connected lanes; in some embodiments, the lanes thus formed may be oriented approximately parallel to each other.

In some embodiments, the platform assembly 10 may be non-folding. In both the folding and the non-folding embodiments, the tables/platforms may be mobile due to there being a) wheels on the tables for mobility; and 2) the tables/platforms capable of being linked together to create a system and unlinked in order to move in a mobile manner to another location to reconnected to create the same system or a modified version of the system (e.g., a system with a different layout or orientation). In one embodiment, the invention may include a series of platform assemblies that are capable of being unlinked, moved to another location either within a facility or into another facility, and linked back together to create the same or a different configuration for sortation in a manner that leverages simple methods for fast disassembly, movement, reassembly and reintegration of the platforms. In one embodiment, the platform assembly may be capable of linking to other platform assemblies to create any configuration for the arrangement of platform 10 with panels 12 and markers 14. In a further embodiment, a system of platform assemblies may have additional platforms added to the system in a modular and scalable manner to change the functional capacity, design, or capability of the sortation system. Further, in one embodiment, the platform assembly may not be retractable but may otherwise retain some or all other characteristics of the platform assemblies as described herein. Accordingly, while several tables/platforms may be linked together form a platform assembly, several such platform assemblies themselves may be linked together using a suitable interlocking mechanism to form a composite layout of integrated platform assemblies.

The platform assembly system can be moved to another location inside a distribution facility, relocated a sorter system to a new facility, expanded with bolt-on or similar other interlocking mechanisms to thereby render the entire system portable, flexible, and modular in a fast and effective fashion. The platform assembly system could be stored in the store back room in a collapsed state, be portable and set up rapidly; following set up, the automated sorting could be performed in a retail location. The platform assembly could advantageously be set up in a portion of the back room which is often used only for a portion of the day, such as the receiving area, and so could be used in existing store buildings without the need for expansion. The portable assembly system could find applications in Pop Up distribution centers, local mini distribution centers, and any other types of short term duration facilities. The platform assembly system could use existing computer-controlled transport vehicles by providing one or more surfaces for the robots to traverse. This solution advantageously provides for faster delivery to customers, lower capital cost of ecommerce fulfillment, better utilization of inventory, reduced delivery costs to customers, and greater worker productivity. The system can fulfill local market ecommerce orders, BOPIS orders, and also be used to sort inbound, less than case quantity per item, store replenishment items to a fine breakdown by aisle or aisle segment to facilitate easier, faster, more productive store shelf replenishment.

The platform assembly 10 includes grid 16 formed on its surface so that the vehicles 18 may traverse along the grid 16. The grid 16 may be formed around, across or in any other configuration on the surface of first panel 12 to facilitate movement of the vehicles 18. In various embodiments, grid 16 represents a grid that may define a path for the vehicles 18 to traverse. The platform assembly 10 further includes a plurality of markers 14 formed on it (markers 14 are not shown in FIG. 1 due to the scale of the drawing; markers 14 are illustrated, for e.g., in FIGS. 7, 8a and 8b), with a container 20 positioned about at least one of the plurality of markers 14. A controller 26 forming part of a control system communicates with vehicles 18 and with a plurality of other components described herein including an induction station positioned on the platform assembly 10, the induction station including an imaging device or scanner 30. In the control system as described herein, through the provision of markers 14, when a vehicle 18 traverses over a specific marker 14, the controller 26 communicates over a network 28 with the vehicle 18 to determine that a specific vehicle 18 is at location "A" associated with a specific container 20, for example (the controller 26 is already aware of the specific location of each of the markers 14 formed on the platform assembly 10). The location of the specific vehicle 18 is then compared with a known association of an order of any type that is being processed (or any type of shipping package processed in the system) with the specific container 20.

Figure 9:
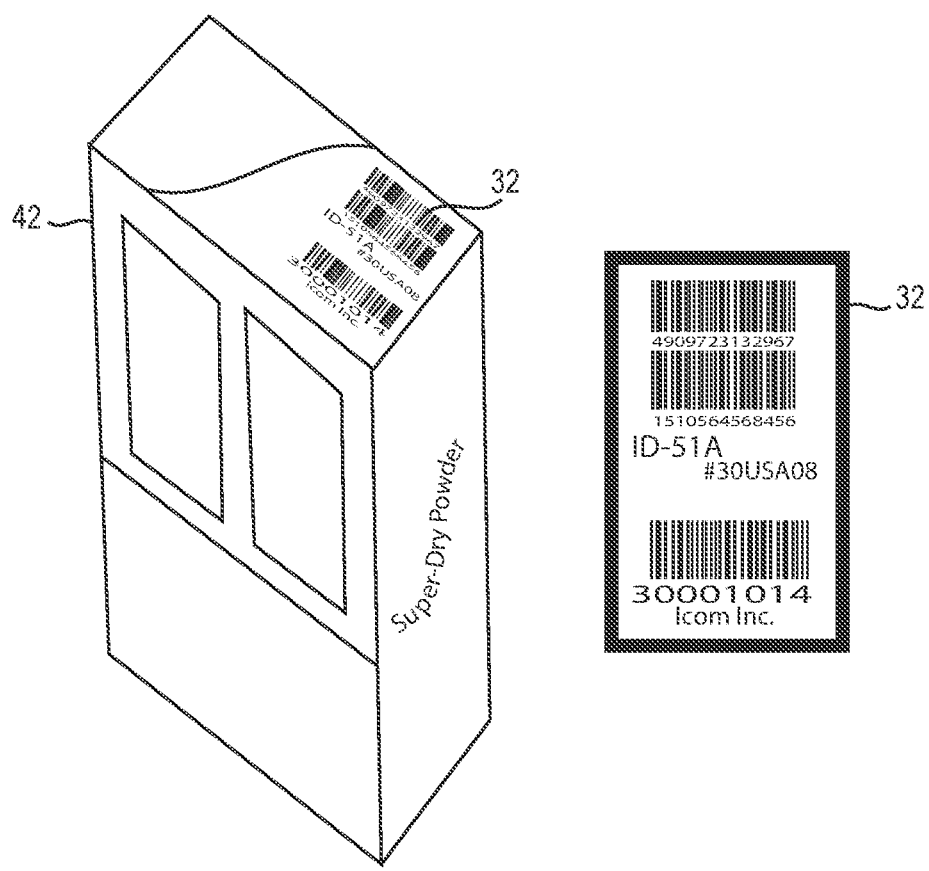
FIG. 9 is a schematic structural diagram of an article with an identifier marked on it according to the present invention.
Figure 10:
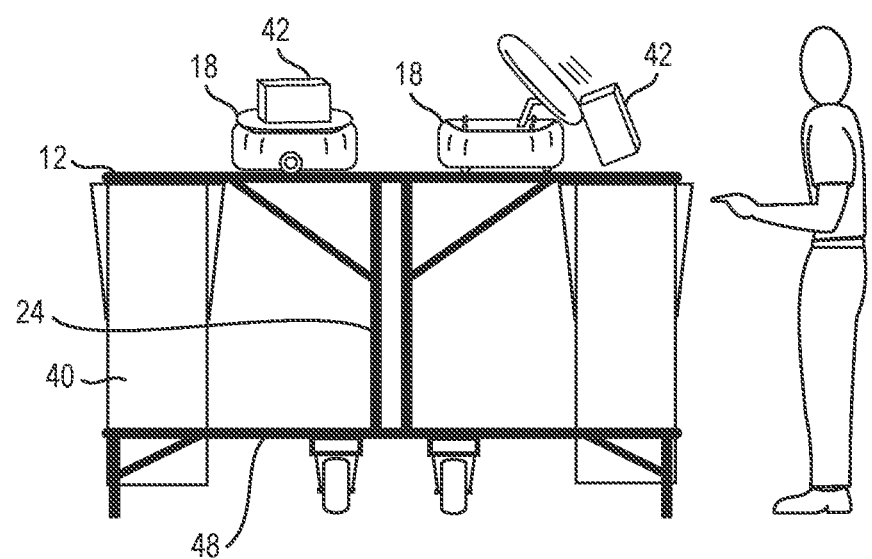
FIG. 10 is a schematic structural diagram of an embodiment of the platform assembly in an extended position with a vehicle delivering an article into a bag according to the present invention.

The vehicle 18 carrying thereon an article 42 associated with the retail order (an exemplary embodiment of an article 42 is illustrated in FIG. 9) may then be directed by the controller 26 to deposit the article 42 into the specific container 20 associated with the specific marker 14 based on the location of the specific marker. Thus, in operation, once the control system determines that a destination container 20 needs an article 42 deposited therein, the controller 26 of the control system causes vehicle 18 to traverse the first panel 12 to the destination container 20 and to deposit the article 42 by manipulation of the vehicle 18 from a first position where the article 42 is firmly located on the vehicle 18 to a second position where the article commences sliding towards the destination container 20 for depositing the selected article 42 in the container 20. As an illustrative example, FIG. 10 shows an example of the vehicles 18 traversing the platform assembly 10 with one of the vehicles 18 shown in the process of depositing an article 42 into a bag 40.

The vehicle 18 may include a sorting robot, a transportation robot, a loading/unloading robot or other types of traveling robots. The vehicle 18, in addition to being in wireless connection with controller 26, may also be in wireless connection with a server. Based on instructions/signals received from the controller 26 of the control system, the vehicle 18 is capable of traveling forward or backward as well as turning along grid 16 to a target area associated with a container 20 as marked by a marker 14 to perform tasks such as unloading (or loading) articles. Grid 16 may be in the form a grid or a track that includes curvatures, as necessary, to facilitate traversing by vehicle 18.

The controller 26 communicates over the network 28, which may be a wired or wireless network. The wireless network may be Bluetooth®, WIFI, a specific Radio Frequency, cellular, and the like. The control system comprising the controller 26 may be embodied as a server with a processor and a memory, where the processor executes many instructions provided herein. The controller 26 may be configured to receive an order for a plurality of disparate articles to fulfill an order. The disparate articles may be a plurality of similar articles having different sizes, colors, and the like, such as apparel, or the disparate articles may be largely unrelated. The controller 26 may be configured to determine one destination container 20 among a plurality of destination containers 20 to deposit, with the vehicle 18, a selected article 42. The controller 26 may be configured to direct the vehicle 18 to transport the selected article which is stowed about the vehicle to the destination container 20 and deposit/unload the article by manipulation of the transport vehicle for deposit of the selected article in the destination container 20. The controller 26 may further be configured to determine when a given retail order is complete.

Figure 4:
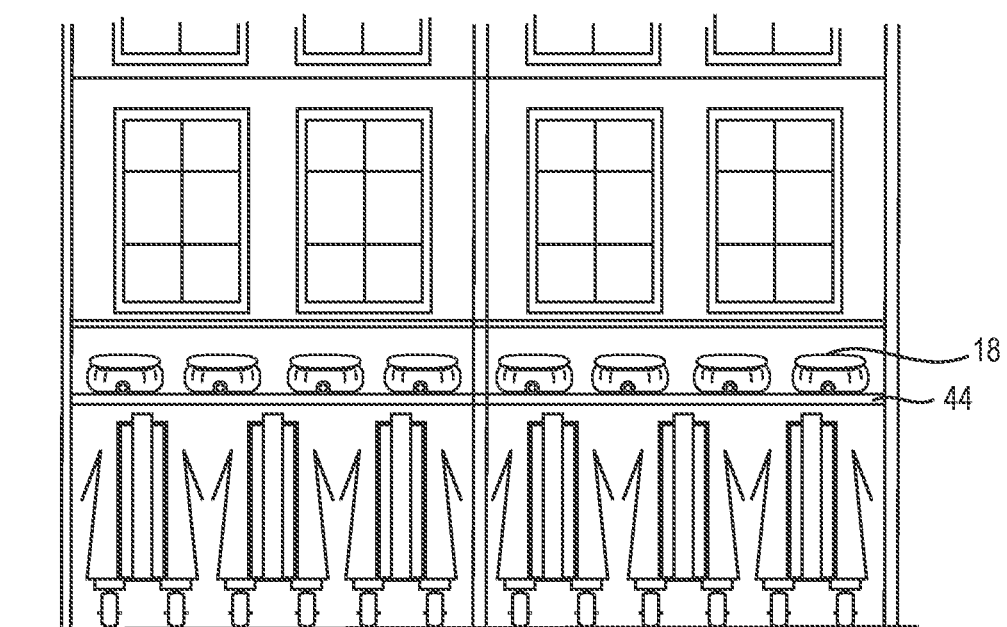
FIG. 4 is a schematic structural diagram of an embodiment of the platform assembly in a retracted position with vehicles stored overhead according to the present invention.

Referring now to FIG. 4, when platform assembly 10 is to be stored, platform assembly 10 is folded in a first orientation in which the platform assembly 10 is in a retracted position. FIG. 4 illustrates several platform assemblies 10 stowed in the retracted position. This ensures that the platform assembly 10 occupies minimal space in its retracted position. Further, prior to the platform assembly 10 being folded to its retracted position, the vehicles 18 may be stored overhead in a vehicle storage location 44 as illustrated in FIG. 4.

Figure 5:
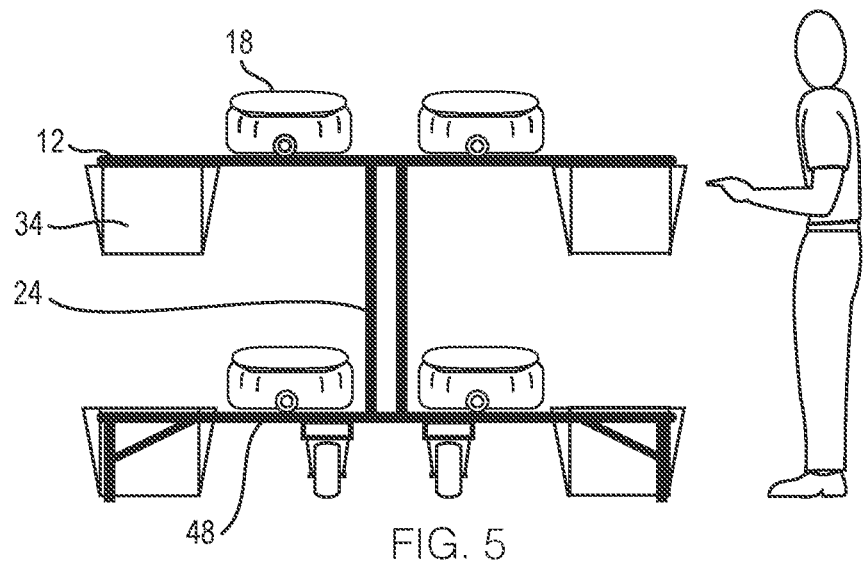
FIG. 5 is a schematic structural diagram of an embodiment of the platform assembly in an extended position with totes provided according to the present invention.
Figure 6:
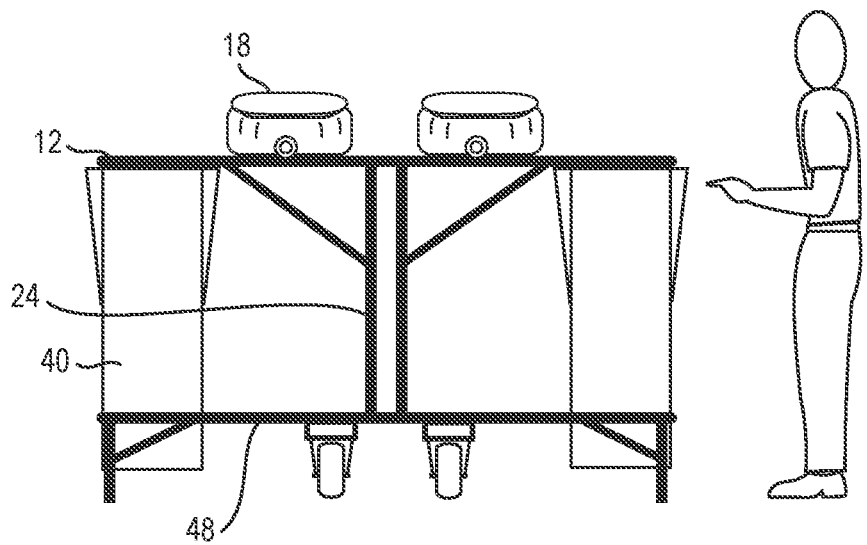
FIG. 6 is a schematic structural diagram of an embodiment of the platform assembly in an extended position with bags provided according to the present invention.

Referring now to FIGS. 5 and 6, the platform assembly 10 further defines a second orientation in which it is in an extended position with a horizontal orientation. In FIG. 5, the containers 20 of FIG. 1 are replaced with totes 34, while in FIG. 6, the containers are replaced with bags 40 having a larger holding capacity as compared to the totes 34 shown in FIG. 5. Further, as shown in FIGS. 5 and 6, the platform assembly 10 includes two panels, i.e., a second panel 48 in addition to the first panel 12, the first panel 12 and second panel 48 being connected by a center support 24 with the first panel 12 elevated higher than the second panel 48. The platform assembly 10 may thus be embodied in a multiple level arrangement, which includes an elevated platform (e.g., first panel 12) above a lower level, which may be the floor or a second platform (e.g., second panel 48). The second panel 48 may be identical to the first panel 12 in structure, layout, function, utility etc. In further embodiments, additional panels may be included in the multiple level arrangement; for example, a third panel, a fourth panel, and several additional panels that are similar to first panel 12 may be respectively positioned parallel to, and below, second panel 48.

Referring now to FIG. 10, there is shown another multiple level arrangement wherein vehicle 18 is directed by controller 26 to deposit an article 42 carried thereon into a bag 40 associated with a marker 14 based on the location of the marker 14.

Figure 7:
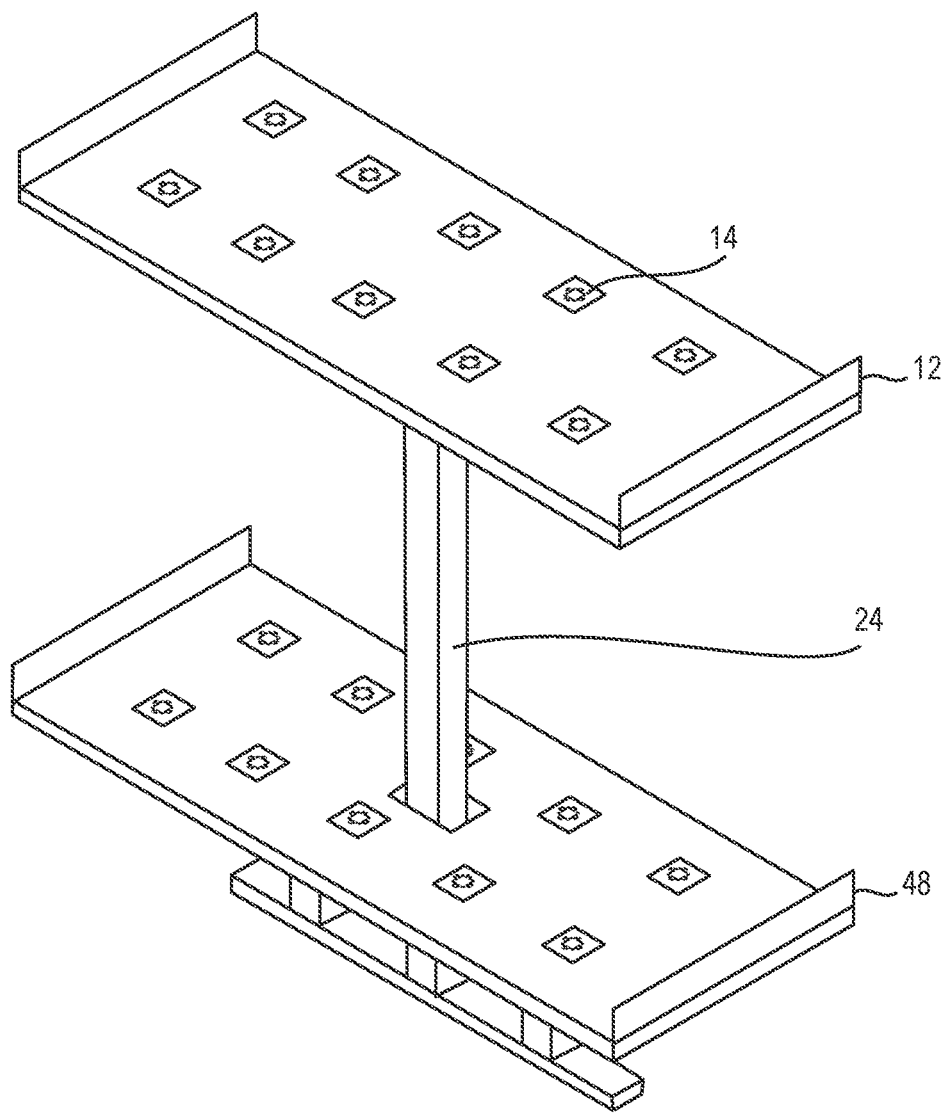
FIG. 7 is a schematic structural diagram of an embodiment of the platform assembly with two panels according to the present invention.

Referring now to FIG. 7, the platform assembly 10 shows the first panel 12 and the second panel 48 connected by the center support 24 with the first panel 12 being elevated compared to the second panel 48. FIG. 7 also show markers 14 marked on both the first panel 12 and the second panel 48 (the grids 16 are not shown in FIG. 7). In some embodiments, the platform assembly 10 may include more than two panels, with the panels positioned above and below one another.

Figure 2:
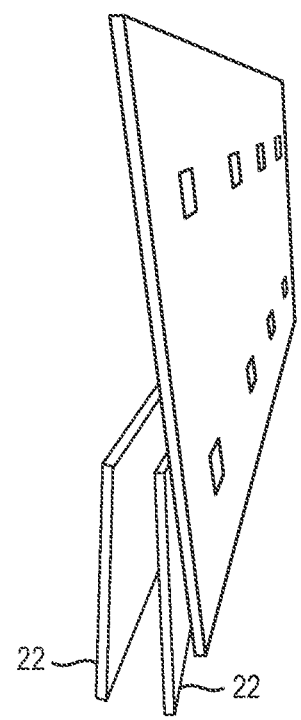
FIG. 2 is a schematic structural diagram of an embodiment of the platform assembly with two partial sections in a retracted position according to the present invention.
Figure 3:
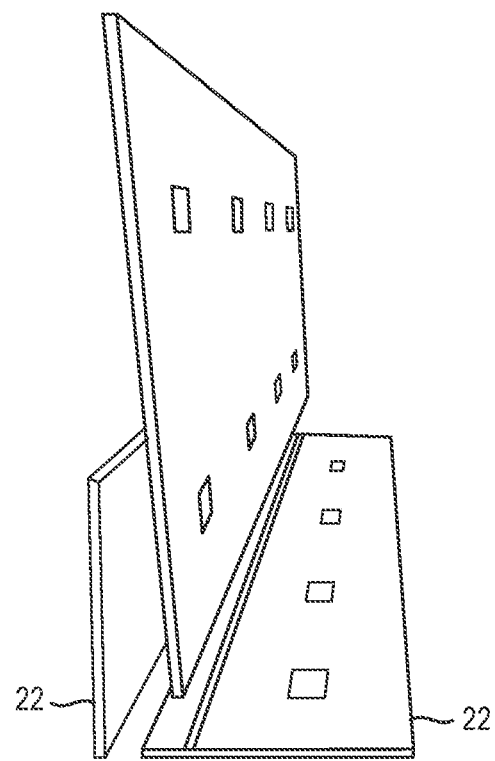
FIG. 3 is a schematic structural diagram of the platform assembly of FIG. 2 with one partial section is in an extended position according to the present invention.

Referring now to FIGS. 2 and 3, FIG. 2 shows the platform assembly 10 in a retracted position (i.e., in the first orientation); in particular, in FIG. 2, two partial sections 22 of the platform assembly 10 are shown to be in the retracted position (i.e., in the first orientation). On the other hand, FIG. 3 shows one of the two partial sections 22 in an extended position (i.e., in the second orientation); in FIG. 3, the other of the two partial sections 22 may be transferred to an extended position whereby the two partial sections 22 provide a level surface for vehicles 18 to traverse therein. The partial sections 22 may be attached to one or more center supports 24 (center support 24 is labeled, for e.g., in FIG. 6) by a hinge which allows the surface of the partial sections 22 to be positioned vertically for storage, or horizontally for sorting operations. In alternate embodiments the partial sections may slide horizontally over each other (or be folded one over the other in a horizontal orientation) for storage whereby the partial sections may be positioned horizontally in a retracted position during storage. Further, as shown in FIGS. 2 and 3, each first panel 12 or second panel 48 may include just one section (see the tallest among the three sections); alternately, each first panel 12 or second panel 48 may include two or more partial sections 22. While FIG. 2 shows the both partial sections 22 located on one side of the tallest section for storage purposes, in other embodiments the partial sections 22 may be located one on each side of the tallest section.

Further, in some embodiments, the platform assembly 10 may include two or more foldable table like sections that are adjoined at the short side such that they form a long platform with one continuous level surface on which transport vehicles 18 may traverse.

Figure 11A:
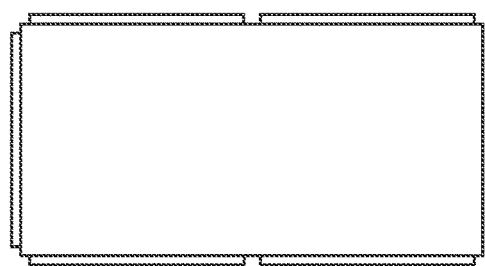
FIGS. 11A-11D are schematic structural diagrams of further embodiments of the platform assembly according to the present invention.
Figure 11B:
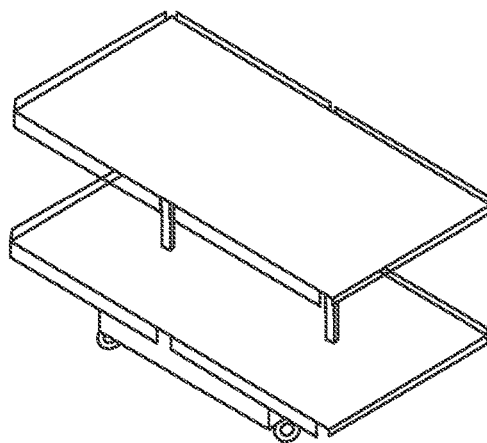
Figure 11C:
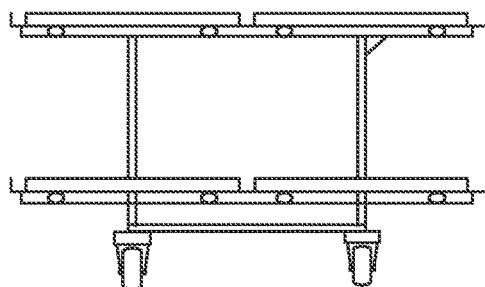
Figure 11D:
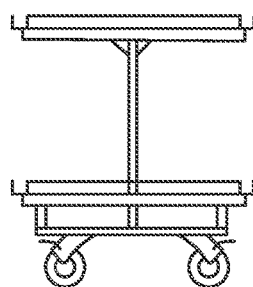

Referring now to FIGS. 11A-11D, FIG. 11A shows a top view of a further embodiment of the panel assembly 10 while FIG. 11B shows a side perspective view of the panel assembly 10 of FIG. 11A. As shown in FIG. 11B, the first panel 12 and the second panel 48 may be connected to each other by two center supports 24. FIG. 11C shows a side view of a furthermore embodiment of the panel assembly 10 while FIG. 11C shows a front view of the panel assembly 10 of FIG. 11C. As shown in FIG. 11A, each of the first panel 12 and the second panel 48 may be consist of two or more partial sections 22. As shown in the embodiments illustrated in FIGS. 11A-11D, the platform assembly 10 may include wheels or similar other mechanism to provide mobility to the panel assembly 10, for example, from a storage location to a sorting location; each of the embodiments further includes provisions for detachably securing the containers 20 to the panel assembly 10. The wheels or similar other mobility mechanism may provide for the movement of the panel assembly to a predetermined destination where the wheels or similar other mechanism may be locked or otherwise disengaged. This results in the disabling of mobility of the panel assembly till such time mobility is re-initiated by re-engaging the wheels or similar other mobility mechanism. This provision facilitates easy movement of the platform assembly from one location to another without the need for additional resources required to lift and transport using a fork-lift, for example, as is traditionally done. In some embodiments, the mobility mechanism may further include a self-powered mechanism to assist with the transport of the platform assembly; in further embodiments, self-powered mechanism may include operable remotely, for example, by controller 26.

Figure 12A:
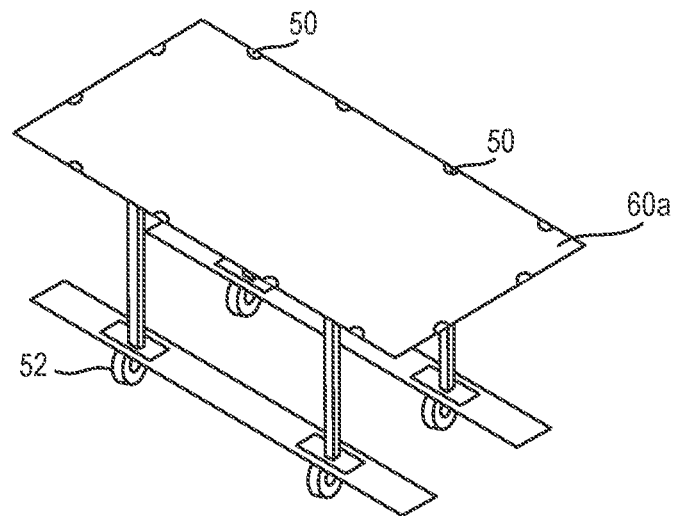
FIGS. 12A-12E are schematic structural diagrams of additional embodiments of the platform assembly according to the present invention.
Figure 12B:
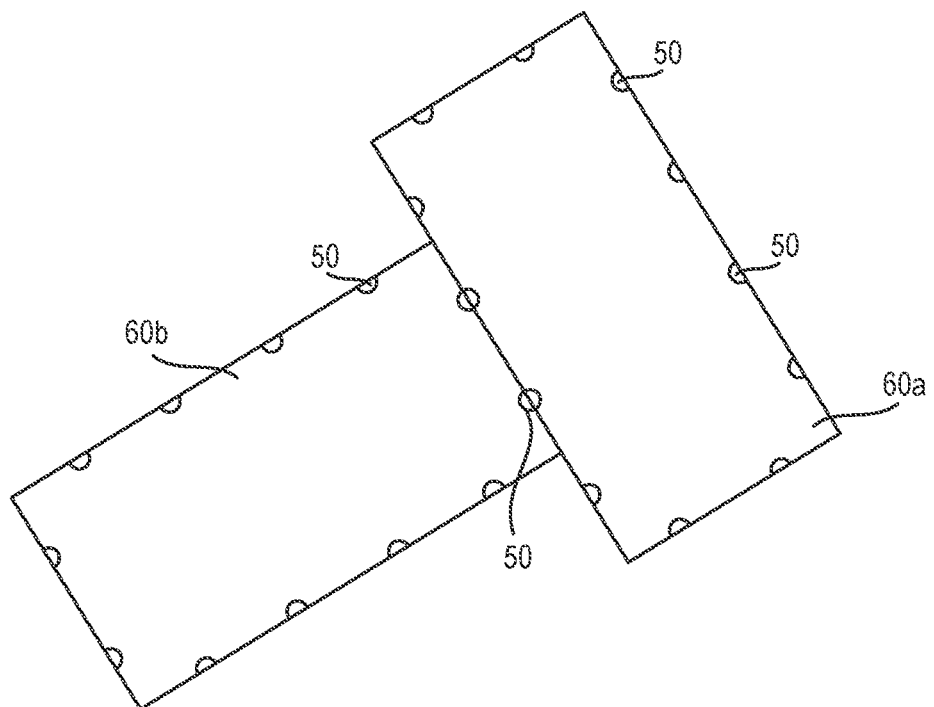
Figure 12C:
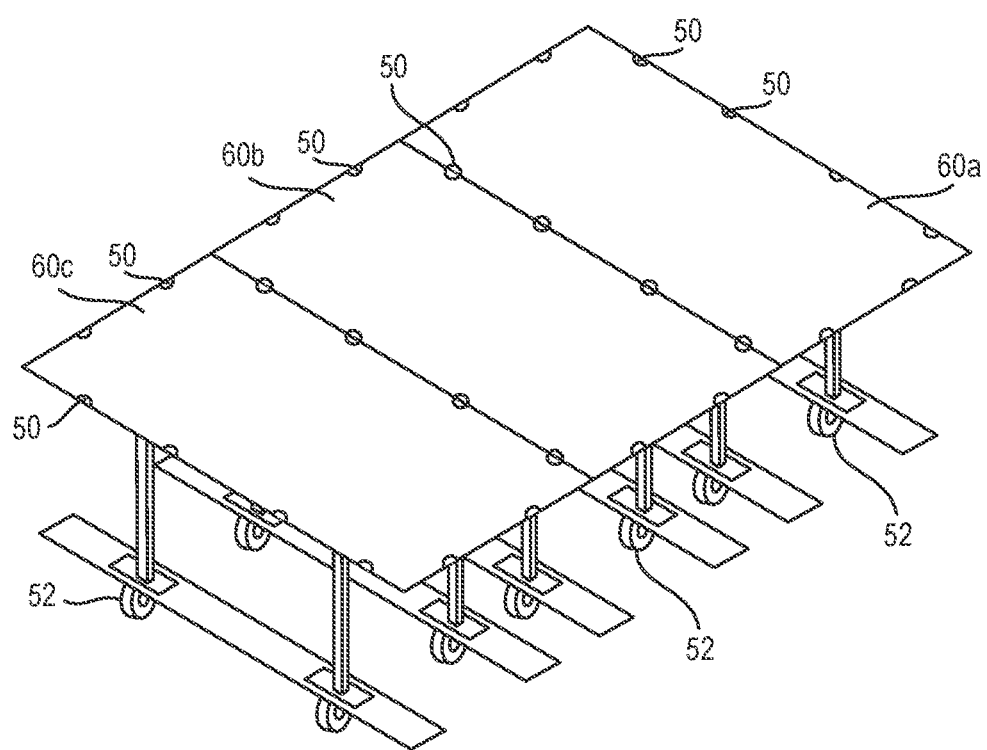
Figure 12D:
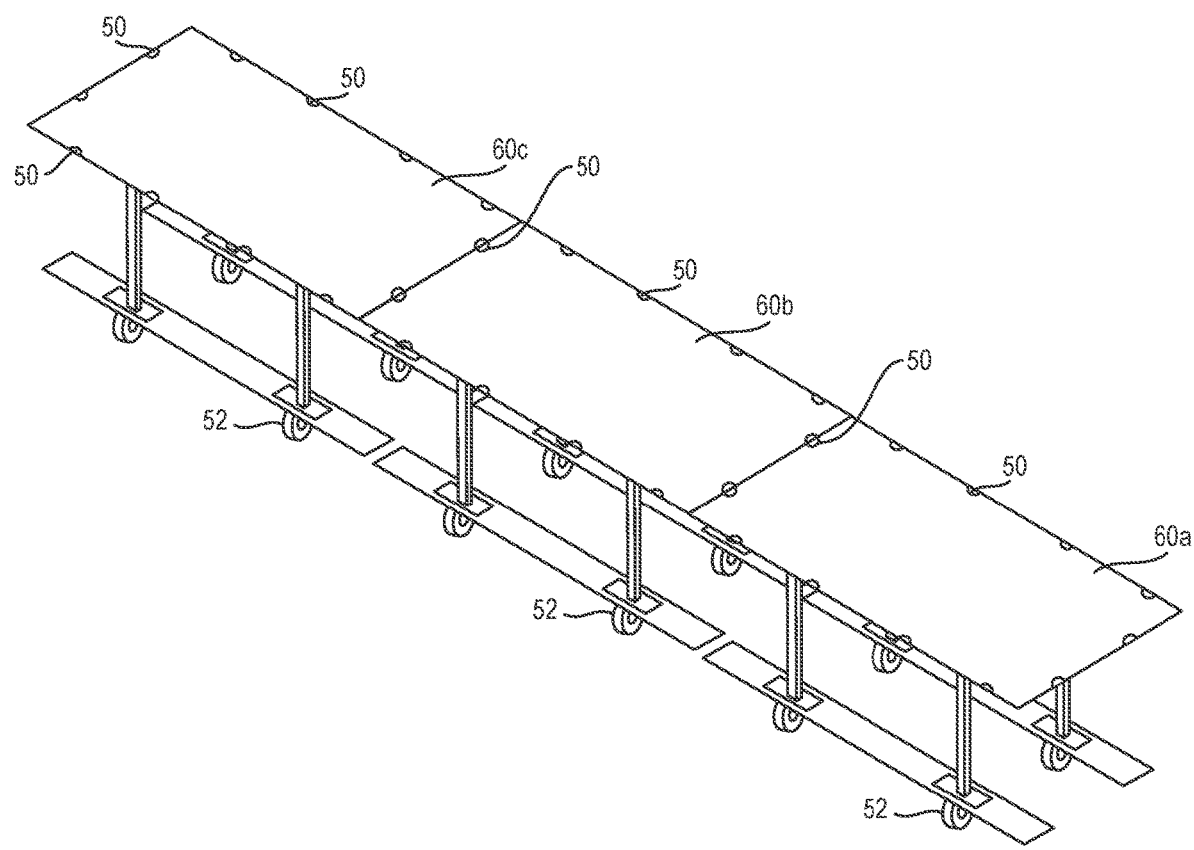
Figure 12E:
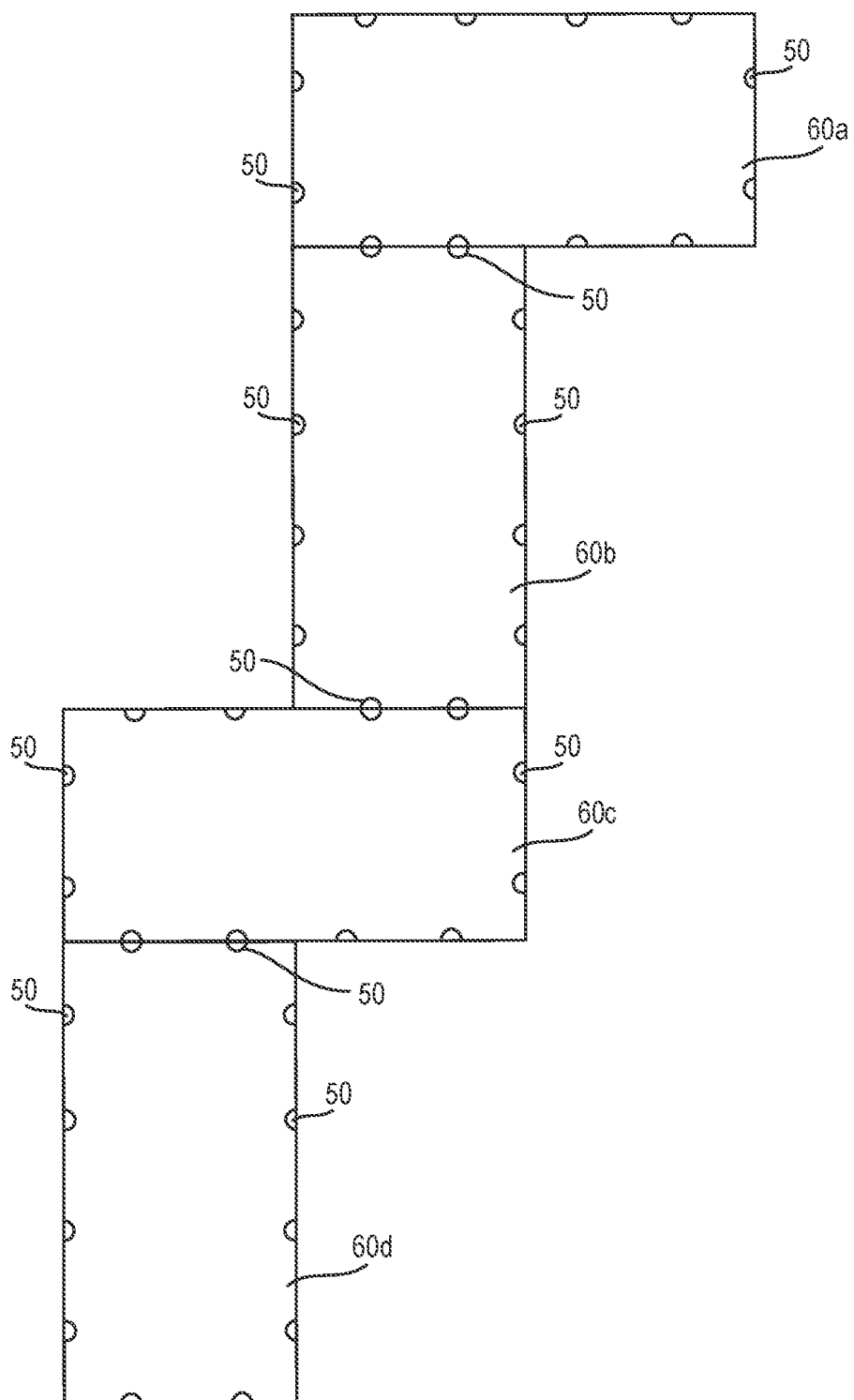

Referring now to FIGS. 12A-12E, FIGS. 12A, 12C and 12D show side perspective views and FIGS. 12B and 12E show top views of further embodiments of the panel assembly 10. As shown in FIG. 12A, first platform 60a may be provided with interlocking mechanisms 50 selectively positioned in a spaced apart configuration along the periphery of each of the platform 60a. The interlocking mechanisms 50 facilitate connecting one platform 60a to an adjacent platform 60b, as shown, for example, in FIG. 12B. In one embodiment, interlocking mechanism 50 represents a bolting mechanism. In another embodiment, interlocking mechanism 50 represents a hook or clip mechanism; for example, in each interlocking mechanism 50 shown in FIG. 12A, a clip on platform 60a may be configured to lock into a corresponding groove on platform 60b (see FIG. 12B) while a clip on platform 60b locks into a corresponding groove on platform 60a. Other interlocking mechanism techniques may be used so long as the interlocking mechanism provides for easy connection and easy disconnection while simultaneously allowing for a substantially secure interlock with an adjoining platform that does not get unlocked inadvertently. Further, the interlocking mechanism 50 is configured such as to permit the interlocked platforms to be dismantled with minimal time and effort when the sorting operations is completed and moved to storage. While FIG. 12A illustrates one configuration of how interlocking mechanisms 50 may be positioned along the periphery of platforms 60a and 60b, various other configurations are possible. For example, the short side may have less than or more than two interlocking mechanisms 50; similarly, the long side may have less than or more than four interlocking mechanisms 50. The location and count of interlocking mechanisms 50 along the periphery of platform 60a may be customized for the requirements of the specific sorting application being undertaken. FIG. 12A further illustrates wheels 52 for providing mobility to platform 60a.

As shown in FIG. 12B, first platform 60a and a second platform 60b may be connected to each other by one or more interlocking mechanism 50 selectively positioned in a spaced apart configuration along the periphery of each of the platforms 60a and 60b. Particularly, in FIG. 12B, a short side of platform 60b is interlocked with a long side of platform 60a to form an embodiment of platform assembly 10 wherein the adjoined platforms form a right angle, whereby platform assembly 10 includes two foldable platforms 60a and 60b that are adjoined such that they form a long platform with one continuous level surface on which transport vehicles 18 may traverse. As illustrated in FIG. 12B, a long side of platform 60a and a short side of platform 60b may be secured by interlocking mechanisms 50.

FIGS. 12C-12E illustrate other interlocking configurations of platforms 60a, 60b, 60c and 60d, as applicable, to generate in a platform assembly 10 that is customized for the specific sorting operation at hand. FIG. 12C shows long sides of platforms 60a, 60b and 60c adjoined to form yet another embodiment of platform assembly 10. FIG. 12D shows short sides of platforms 60a, 60b and 60c adjoined to form a further embodiment of platform assembly 10. FIG. 12E shows short sides and long sides of platforms 60a, 60b, 60c and 60d adjoined to form another embodiment of platform assembly 10. It should be noted that each of the platforms 60a, 60b, 60c and 60d is provided with wheels 52 or similar other mobility arrangement such that each of these platforms may be rolled into a requisite position with a requisite orientation and interlocked or latched on, or bolted on, or interlocked, to the neighboring platform with minimal time and effort. Each of the platforms 60a, 60b, 60c and 60d may possess similar qualities as was previously explained with regard to platform assembly 10. For example, each of the platforms 60a, 60b, 60c and 60d may include tracks or grids 16 and first panels 12 that may include partial sections 22 that may have a retracted position and an extended position, among others. While FIGS. 12A-12E show only first panels 12 for ease of illustration, other embodiments may include second panels 48 as well as additional panels, as required by the specific sorting application.

As shown in the embodiments illustrated in FIGS. 12A-12E, the platform assembly 10 may include wheels 52 or similar other mechanisms for providing mobility to the panel assembly 10, for example, from a storage location to a sorting location; each of the embodiments may further include provisions for detachably securing the containers 20 to each of the platforms 60a, 60b, 60c and 60d by way of the interlocking mechanisms 50. The wheels or similar other mobility mechanism may provide for the movement of the platforms 60a, 60b, 60c and 60d to a predetermined destination where the wheels or similar other mechanism may then be locked or otherwise disengaged. This results in the disabling of mobility of the platforms 60a, 60b, 60c and 60d till such time mobility is re-initiated by re-engaging the wheels or similar other mobility mechanism. This provision facilitates easy movement of the platforms 60a, 60b, 60c and 60d from one location to another without the need for additional resources required to lift and transport using a fork-lift, for example, as is traditionally done. In some embodiments, the mobility mechanism may further include a self-powered mechanism to assist with the transport of platforms 60a, 60b, 60c and 60d; in further embodiments, self-powered mechanism may be operable remotely, for example, by a controller such as controller 26. Further, each of the platforms 60a, 60b, 60c, and 60d (collectively referred to herein as "platform 60") may include a platform controller that is configured similar to controller 26.

As noted earlier, and as shown, for e.g., in FIG. 10, the vehicle 18 is directed by controller 26 of the control system to deposit an article 42 carried thereon into a bag 40 associated with a marker 14 based on a location of the marker 14. In this manner, there may be provided a container such as a box (or alternatively a bag or a tote or any other receptacle) intended for a certain recipient associated with a particular order, for example. Once all articles associated with that recipient have been deposited by one or more vehicles 18 controlled by the controller 26 in a specific container or receptacle associated for the certain recipient associated with the particular order, the controller 26 may inform a user to come and remove the container or receptacle proximal the platform assembly 10. In case of this receptacle being a shipping container, the operator would seal the container shut with tape, and then replace the shipping container with a new, empty shipping container associated with another order.

Figure 8A:
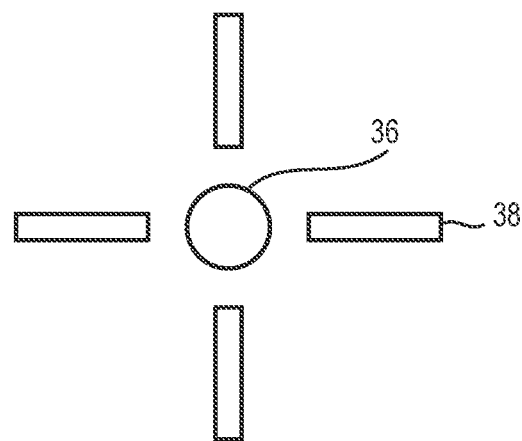
FIGS. 8a and 8b are schematic structural diagrams of markers according to various embodiments of the present invention.
Figure 8B:
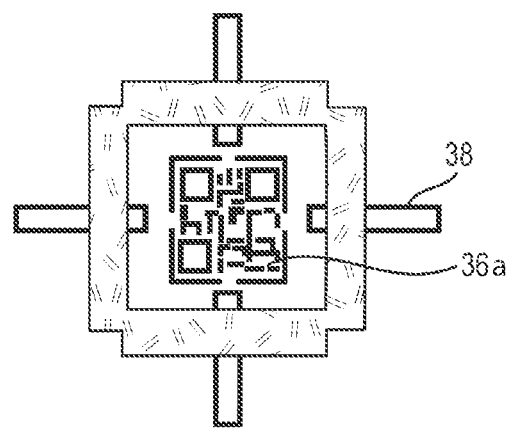

Referring now to FIGS. 8a and 8b, FIG. 8a provides one configuration of the marker 14 formed on platform assembly 10. In various embodiments, the markers 14 may include RFID tags, QR codes, magnetic arrays, other navigation or location identification methods, and the like. FIG. 8a illustrates one example of marker 14 that includes a RFID tag 36 that is bordered by one or more magnets that are inducted, taped, or applied by other means to the surface of first panel 12. The system may include any number of other types of navigation or location identification methods to include QR codes and any other method. As illustrated in this specific example of a system of RFID and magnets, in one embodiment as shown in FIG. 8a, marker 14 may include a magnetic array comprising magnetic bars 38 that extend from a periphery of the RFID tag 36 and create a combined magnetic field. In an alternate embodiment as shown in FIG. 8b, marker 14 may include a magnetic array comprising magnetic bars 38 that extend from a periphery of QR code 36a. In a further embodiment not illustrated herein, one magnetic bar may be "missing' in order to alter the magnetic field. In another embodiment not illustrated herein, one magnetic bar may be "double stacked" on another magnetic bar on one side. In a furthermore embodiment not illustrated herein, in addition to, or in lieu of, the above arrangements, one magnetic bar may be of the opposite magnetic polarity as the others. The magnetic bars may further follow other patterns in order to produce various magnetic signatures. By reading the RFID tag 36 and by further measuring the magnetic force with an interrogator and imaging device (the magnetic force corresponding to the magnetic field that produces the magnetic signature), the control system can determine location (by the RFID tag) and orientation (by the magnetic force). RFID or a similar other measurement system may interact with the RFID tag for determining location.

Referring to FIG. 9, at the induction station, an imaging device or scanner 30 interacts with an identifier 32 present on an article 42. As shown in FIG. 9, the identifier may be a UPC code; alternatively, the identifier may be a similar other unique identification code. The imaging device or scanner 30 is positioned proximal the platform assembly 10. In one embodiment, the imaging device or scanner 30 is a UPC scanner; in an alternate embodiment, the imaging device or scanner 30 may be carried by, and operated by, a person, i.e., the imaging device or scanner 30 may not be fixedly positioned. In a further embodiment, each vehicle 18 may include a scannable code such that when an article 42 is placed on the vehicle 18, the imaging device or scanner 30 scans both the UPC on the article 42 and the scannable code on the vehicle 18 to determine which article is associated with which vehicle. Alternatively, the vehicle 18 may include an imaging device or scanner mounted thereon for imaging the code or identifier 32 present on the article 42. All of these identification devices may be RFID tags, other types of bar codes, or any other type of item and vehicle recognition methods.

In some embodiments, each platform may represent an "intelligent" platform in that each platform may be equipped to allow for communication with vehicles, between platforms, and across an entire configuration of a plurality of platforms (or across a plurality of platform assemblies) as applicable. Such communication capability may advantageously permit transmission of messages, directions, and other signals between a platform and vehicles and any other devices that traverse the surface of the platform; such communication capability may also advantageously permit passage of messages, directions, and other signals between and among several platforms. The platforms may communicate wirelessly with the vehicles and any other devices that travel upon the surfaces to transmit data and information associated with location (location information), direction (direction information), and operational parameters of the system (system operation parameters information) to facilitate the movement of the vehicles and any other devices. In one embodiment, the platform may provide absolute or relational location information to the vehicles. The absolute location information may represent the x, y, z coordinates of the vehicle at a given instant whereas the relational information may represent the position of the vehicle in relation to a marker. Similarly, the direction information too may be absolute or relational. The system operation information may include the number of articles currently headed to the same container as the vehicle, the number of articles already contained in the container, the speed of vehicles ahead of or behind a given vehicle and their respective speeds, the number of trips scheduled for a given vehicle, the physical parameters of the articles to be transported by a given vehicle, and similar other system parameters.

In such embodiments, one or more platforms of the platform assembly may be provided with its own dedicated controller that is configured similar to controller 26. As a result, the controller residing on the platform (referred to hereinafter as "platform controller") may form part of a control system communicates with vehicles and with a plurality of other components described herein including an induction station positioned on the platform assembly as well as the imaging device or scanner. Accordingly, when a vehicle 18 traverses over a specific marker 14, the platform controller may communicate over a network 28 with the vehicle 18 to determine that a specific vehicle 18 is at location "A" associated with a specific container 20, for example (the platform controller is already aware of the specific location of each of the markers 14 formed on the platform assembly 10). The location of the specific vehicle 18 is then compared with a known association of an order of any type that is being processed (or any type of shipping package processed in the system) with the specific container 20. The platform controller may further communicate over the network 28, which may be a wired or wireless network. The wireless network may be Bluetooth®, WIFI, a specific Radio Frequency, cellular, and the like. The platform controller may be embodied as a server with a processor and a memory, where the processor executes many instructions provided herein. The platform controller, in coordination with the control system, as applicable, may be configured to receive an order for a plurality of disparate articles to fulfill an order. In some embodiments, the platform controller may be independent in that it may not be in communication with the control system. The disparate articles may be a plurality of similar articles having different sizes, colors, and the like, such as apparel, or the disparate articles may be largely unrelated. The platform controller may be configured to determine one destination container 20 among a plurality of destination containers 20 to deposit, with the vehicle 18, a selected article 42. The platform controller may be configured to direct the vehicle 18 to transport the selected article which is stowed about the vehicle to the destination container 20 and deposit/unload the article by manipulation of the transport vehicle for deposit of the selected article in the destination container 20. The platform controller may further be configured to determine when a given retail order is complete.

In some embodiments, the platform assembly may include a drive mechanism configured to impart mobility or locomotion to the vehicles 18 traversing the platform. In embodiments that include the drive mechanism, the vehicles 18 may not be self-driven and instead be driven (i.e., caused to move) by the drive mechanism. In one embodiment, the drive mechanism provides locomotion to the vehicles 18 along grid 16. In one embodiment, in addition to the drive mechanism, the controls for the drive mechanism too may form part of the platform. The grids, the drive mechanism, and the controls for the drive mechanism may be configured to facilitate the travel of vehicles 18 in several routes and in several directions, for e.g., east, west, north, and south directions. In some embodiments, the drive mechanism may be configured to provide locomotion to otherwise self-driving vehicles 18. In one embodiment, the drive mechanism may operate on a gear and pinion principle. In another example, the drive mechanism may operate on a gear and chain principle. In a further example, the drive mechanism may be based a conveyor-belt principle. In other embodiments, the drive mechanism may be based on as similar other principle that is suitable for the application.

Now additional exemplary aspects of how the method of sorting articles by the sorting system is explained. In operation, a retail store or e-commerce marketplace receives a plurality of orders. The plurality of orders may then be separated and aggregated by a location. For example, the plurality of orders may be aggregated to delivery locations within 50 miles of Charlotte, N.C. Accordingly, each order that is to be delivered to an address within 50 miles of Charlotte, N.C. is sent to a retailer or warehouse in Charlotte, N.C. The orders may be cross-checked against inventory on hand at the retailer or warehouse; the orders may also be checked for other relevant characteristics before a batch of such orders are picked by an employee so that the batched set of orders can be filled and shipped. Similarly, a batch of BOPIS orders may be sent to a local facility where customers have placed those orders for pick up at a future time, typically within a few hours and on the same day.

A batch of such orders is then picked by an employee. In a retail setting, the articles associated with the batched set of orders may be picked from the retail shelves or from articles stored within the warehousing portion of a retail location. As an example, below is provided a simplified batched set of orders:

Order 1: 3 red shirts, 2 green shoes, 5 white shirts
Order 2: 1 red shirt, 5 green shoes, 2 white shirts
Order 3: 2 red shirts, 4 green shoes, 4 white shirts
Order 4: 2 boxes of cereal, 3 items of canned vegetables, a pickle jar, and a tube of refrigerated cookie dough
Order 5: 3 red shirts, 1 box of cereal, 3 packs of prepackaged food, and a notebook The batched set of orders stated above includes represents 43 items across 5 orders that may be BOPIS or for local ecommerce delivery. An employee gathers all 43 items in the batched set, without sorting the 43 items by individual orders. In most cases, such a system would be set up to process a few to hundreds of orders in a batch manner as described.

To sort the articles by each individual order, the platform assembly 10 is moved from its storage location to a suitable location; then, in the case of a foldable embodiment, the disposition of the platform assembly 10 is changed from a retracted position to an extended position. The vehicles 18, which are in wireless connection with controller 26, and optionally in wireless connection with a server, are then placed on platform assembly 10 such that each of the vehicles 18 is able to identify its position relative to the markers 14 on the platform assembly 10 and is accordingly capable of traversing the platform assembly 10. Multiple platform assemblies 10 can be joined in a configuration to allow a system to be as large as needed to process the quantity of orders and volume of order items in the batch.

The batched items (i.e., the 43 items) are then positioned on or in proximity to the platform assembly 10 where the controller 26 controlling the imaging device or scanner 30 located at the induction station determines that a first article is a white shirt, and coordinates the placement of the first article on vehicle 18-1, and directs the vehicle 18-1 to deposit the first article in container no. 3 (among several containers 20), which the controller knows is associated with marker no. A3 (among several markers 14; the markers 14 may include RFID tags and/or other identification methods). The vehicle 18-1 moves proximal to marker no. A3, then deposits the article into container no. 3. The routine is repeated for each of the remaining 26 items. When each of the individual orders 1, 2 and 3 are filled within each associated container 20, each of the containers is removed, packaging label applied if not already present, and prepared for delivery to the recipient.

Thus, a batch of orders can be packed for shipment through the use of the automated system as explained herein. Once all of the orders in the batch are packaged, the orders may then be sorted by zip code or by other local delivery hub belonging to a courier service, the US Post Office, or other delivery agent. The automated system can also be used for large grouping of orders for delivery wherein one large group of orders may be consolidated into a single large container such as a traditional shipping polybag, letter pack, large envelop, or a large box across a wide range of sizes.

In one implementation, a given retail or ecommerce shipping location may service dozens of such delivery hubs in a given local area, with a plurality of order parcels to be sorted and shipped to each of those delivery hubs. In such a case, at the given retail or ecommerce shipping location, the plurality of order parcels to be sorted and shipped may be positioned on or in proximity to the platform assembly 10 as described herein where, the imaging/scanner device 30 determines that the first package has a barcode that designates the order information that the controller 26 recognizes as being destined for a particular delivery hub. The controller 26 coordinates placement of the first package on vehicle 18-1, and coordinates the deposition of the first package in a container associated with delivery hub location no. 3, which the controller recognizes as being associated with marker no. A3. The vehicle 18-1 being controlled by controller 26 moves proximal to marker no. A3, then deposits the package into the container associated with delivery hub location no. 3. This routine is repeated for each remaining parcel packages. After all packages to a delivery hub are placed in the associated container, the container may be removed, and prepared for delivery. Alternately, if the container gets filled prior to placement of all packages associated with the delivery hub, the container may be removed and replaced with a new container to be filled with the remaining packages destined for the same delivery hub as the filled-up container.

The platform assemblies and systems as described herein may form a system for the processing of the following elements in the below applications:

Items to fulfill ecommerce orders
Items to fulfill BOPIS orders
Shipping packages for delivery to end customers
Items to fulfill retail store replenishment orders
Cartons containing store replenishment items
Items for returns, kitting, or any other process where individual items or packages are sorted into groups, orders, or other required quantities
In a retail store
In a local mini distribution center
In a pop up fulfillment center
In a regional or national distribution center or ecommerce fulfillment center As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

What is claimed is:

1. A platform assembly for use with sorting articles, comprising:
    a plurality of platforms connected to each other to form at least one surface for transit thereabout by a plurality of vehicles, each platform including a first panel comprising a plurality of markers thereon, the markers forming a grid on the first panel for transit thereabout by the plurality of vehicles,
    wherein an article receptacle is positioned about at least one of the plurality of markers,
    wherein a control system identifies a location of each of the plurality of markers,
    wherein, in operation, the vehicle is directed by the control system to deposit an article carried thereon into an article receptacle associated with a marker based on the location of the marker.

2. The platform assembly of claim 1, wherein the plurality of platforms comprises a first platform and a second platform, wherein the first panel of the first platform has a horizontal disposition, and wherein the first panel of the second platform does not have a horizontal disposition.

3. The platform assembly of claim 1, wherein the plurality of platforms comprises a first platform and a second platform, wherein both the first panel of the first platform and the first panel of a second platform do not have a horizontal disposition.

4. The platform assembly of claim 1, wherein the plurality of platforms comprises a first platform and a second platform, wherein a short side of the first panel of the first platform adjoins a short side of a first panel of the second platform such that the first panels of the first and second platforms form a common surface for transit thereabout by the plurality of vehicles.

5. The platform assembly of claim 1, wherein the plurality of platforms comprises a first platform and a second platform, wherein a short side of the first panel of the first platform adjoins a long side of a first panel of the second platform such that the first panels of the first and second platforms form a common surface for transit thereabout by the plurality of vehicles.

6. The platform assembly of claim 1, wherein the plurality of platforms comprises a first platform and a second platform, wherein one of a short side and a long side of the first panel of the first platform adjoins one of a short side and a long side of a first panel of the second platform such that the first panels of the first and second platforms form a common surface for transit thereabout by the plurality of vehicles.

7. The platform assembly of claim 1, wherein the platform assembly is non-retractable.

8. The platform assembly of claim 1, wherein the plurality of platforms comprises a first platform and a second platform, wherein the first platform is detachably attached to the second platform by an interlocking mechanism.

9. The platform assembly of claim 1, further comprising a self-powered mechanism for transporting one or more components of the platform assembly.

10. The platform assembly of claim 1, wherein each platform assembly further comprises a drive mechanism configured for imparting mobility to a device traversing the platform.

11. The platform assembly of claim 1, wherein the article receptacle comprises a tote, wherein the platform assembly further comprises a tote removing mechanism.

12. The platform assembly of claim 1, wherein the control system is further configured for directing placement of an article about a vehicle by a human operator.

13. The platform assembly of claim 1, wherein each platform further includes a second panel, wherein the first panel is elevated compared to the second panel.

14. The platform assembly of claim 13, further comprising a single induction station servicing both the first panel and the second panel.

15. The platform assembly of claim 13, wherein each platform further includes a third panel, wherein the second panel is elevated compared to the third panel.

16. The platform assembly of claim 15, wherein each platform further includes a fourth panel, wherein the third panel is elevated compared to the fourth panel.

17. The platform assembly of claim 1, wherein the platform assembly is immobile.

18. The platform assembly of claim 17, wherein a mobility resource lifts and transports the platform assembly from a first location to a second location.

19. A system for use with sorting articles, the system comprising:
    a platform assembly comprising a plurality of platforms connected to each other to form at least one surface for transit thereabout by a plurality of vehicles, each platform including a first panel comprising a plurality of markers thereon, the markers forming a grid on the first panel for transit thereabout by the plurality of vehicles, and a controller identifying a location of each of the plurality of markers, the controller further communicating over a network with a vehicle to provide one or more of location information, direction information, and system operation parameters information to the vehicle to facilitate transit of the vehicle on the first panel to deposit an article carried thereon into an article receptacle associated with a marker based on the location of the marker.

20. The system of claim 19, further comprising a self-powered mechanism for transporting one or more components of the platform assembly.

21. The system of claim 19, wherein the article receptacle comprises a tote, wherein the platform assembly further comprises a tote removing mechanism.

22. The system of claim 19, wherein the plurality of platforms comprises a first platform and a second platform, wherein the first panel of the first platform has a horizontal disposition, and wherein the first panel of the second platform does not have a horizontal disposition.

23. The system of claim 19, wherein the plurality of platforms comprises a first platform and a second platform, wherein one of a short side and a long side of the first panel of the first platform adjoins one of a short side and a long side of a first panel of the second platform such that the first panels of the first and second platforms form a common surface for transit thereabout by the plurality of vehicles.

24. The system of claim 23, further comprising a single induction station servicing both the first panel and the second panel.

25. A platform assembly for use with sorting articles, comprising:
  a plurality of platforms connected to each other to form at least one surface for transit thereabout by a plurality of vehicles, each platform including a first panel for transit thereabout by the plurality of vehicles,
  wherein at least one article receptacle is positioned about the at least one surface,
  wherein a control system identifies a location of the at least one article receptacle,
  wherein, in operation, the vehicle is directed by the control system to deposit an article carried thereon into the at least one article receptacle based on the location of the at least one article receptacle.

* * * * *